(12) United States Patent
Chari (10) Patent No.: US 9,088,391 B2
(45) Date of Patent: *Jul. 21, 2015

(54) TEMPERATURE COMPENSATED CARRIER OFFSET CORRECTION OF A RECEIVED SIGNAL

(71) Applicant: Imagination Technologies, Limited, Kings Langley (GB)

(72) Inventor: Sujai Chari, Burlingame, CA (US)

(73) Assignee: Imagination Technologies, LLC (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/574,967

(22) Filed: Dec. 18, 2014

(65) Prior Publication Data

US 2015/0103965 A1 Apr. 16, 2015

Related U.S. Application Data

(63) Continuation-in-part of application No. 13/543,481, filed on Jul. 6, 2012, now Pat. No. 8,942,317.

(51) Int. Cl.
| | |
|---|---|
| *H04L 7/00* | (2006.01) |
| *H04L 7/04* | (2006.01) |
| *H04L 27/00* | (2006.01) |
| *H04L 27/26* | (2006.01) |

(52) U.S. Cl.
CPC .............. *H04L 7/0016* (2013.01); *H04L 7/042* (2013.01); *H04L 27/0014* (2013.01); *H04L 27/2657* (2013.01); *H04L 2027/003* (2013.01); *H04L 2027/0048* (2013.01); *H04L 2027/0095* (2013.01)

(58) Field of Classification Search
CPC . H04L 7/042; H04L 7/0016; H04L 2027/003; H04L 2027/0095; H04L 27/0014; H04L 27/0048; H04L 27/0065; H04L 27/2656; H04L 27/2657; H04L 27/2663
See application file for complete search history.

(56) References Cited

U.S. PATENT DOCUMENTS

| | | | |
|---|---|---|---|
| 7,298,787 | B2 | 11/2007 | Priotti |
| 7,426,199 | B2 * | 9/2008 | Sondur et al. ................ 370/332 |
| 8,416,759 | B1 | 4/2013 | Narasimhan et al. |
| 8,817,921 | B2 * | 8/2014 | Lee et al. ....................... 375/343 |
| 8,867,520 | B2 * | 10/2014 | Nicholls et al. .............. 370/350 |
| 2009/0080576 | A1 | 3/2009 | Xiang |
| 2009/0262018 | A1 * | 10/2009 | Vasilyev et al. .......... 342/357.12 |
| 2009/0323515 | A1 | 12/2009 | Ishikura et al. |
| 2009/0323793 | A1 | 12/2009 | Chang et al. |
| 2010/0080114 | A1 | 4/2010 | Ratnam et al. |
| 2010/0135437 | A1 | 6/2010 | Lee et al. |
| 2011/0007644 | A1 | 1/2011 | Walker |

* cited by examiner

*Primary Examiner* — Leon Flores
(74) *Attorney, Agent, or Firm* — Brian R. Short (57) ABSTRACT

Apparatuses, methods and systems for mitigating carrier offset of a received signal are disclosed. One embodiment of a receiver includes a controller operative to determine that a communication signal being received is from a desired transmitter, and to determine a carrier offset correction based on prior reception of communication signals from the desired transmitter, comprising retrieving a carrier offset of the desired transmitter from one or more stored carrier offsets based on previous communication with the desired transmitter and a temperature of the receiver. The receiver further includes a receiver chain operative to receive the communication signal from the desired transmitter, and to generate a carrier offset corrected received signal based on the retrieved carrier offset by applying the carrier offset correction to the received communication signal. The receiver is operative to synchronize to the carrier offset corrected received communication signal.

20 Claims, 7 Drawing Sheets

TEMPERATURE COMPENSATED CARRIER OFFSET CORRECTION OF A RECEIVED SIGNAL

RELATED APPLICATIONS

This patent application is a continuation-in-part (CIP) of U.S. patent application Ser. No. 13/543,481, filed Jul. 6, 2012, which in herein incorporated by reference.

FIELD OF THE DESCRIBED EMBODIMENTS

The described embodiments relate generally to wireless communications. More particularly, the described embodiments relate to systems, methods and apparatuses for temperature compensated carrier offset correction of a received signal.

BACKGROUND

Receivers in communication systems often must receive and detect signals of interest in the presence of various impairments. If the impairments are not compensated by the receiver in some manner, the performance of the receiver may be degraded often precluding proper demodulation/decoding of the signal of interest. Examples of impairments include carrier offset, timing offset, thermal noise, I/Q imbalance, interference, DC offset, channel dispersion.

Prior solutions estimate these impairments during some portion of the data being received and apply mitigation techniques to minimize the performance degradation. Some disadvantages of estimating these impairments during reception of the data include the estimation being noisy due to insufficient data being used to derive estimate, the estimation occurs after processing of certain receiver functions such as synchronization thereby degrading the accuracy of those functions, and increased latency of processing the received data due to the impairment estimation that must occur prior to processing of various receiver function. Further, another disadvantage includes the power consumed by the computation for impairment compensation during data reception.

It is desirable to have methods apparatuses, and systems for overcoming the above-described impairments, including carrier offset and timing offset impairments.

SUMMARY

An embodiment includes a receiver. The receiver includes a controller operative to determine that a communication signal being received is from a desired transmitter, and to determine a carrier offset correction based on prior reception of communication signals from the desired transmitter, comprising retrieving a carrier offset of the desired transmitter from one or more stored carrier offsets based on previous communication with the desired transmitter and a temperature of the receiver. The receiver further includes a receiver chain operative to receive the communication signal from the desired transmitter, and to generate a carrier offset corrected received signal based on the retrieved carrier offset by applying the carrier offset correction to the received communication signal. The receiver is operative to synchronize to the carrier offset corrected received communication signal.

Another embodiment includes a receiver. The receiver includes a controller operative to determine that a communication signal being received is from a desired transmitter, and to determine a carrier offset correction based on prior reception of communication signals from the desired transmitter including retrieving a timing offset of the desired transmitter from one or more stored timing offsets based on previous communication with the desired transmitter. The receiver further includes a receiver chain operative to receive the communication signal from the desired transmitter, to calculate a carrier offset correction based on the retrieved timing offset, and to generate a carrier offset corrected received signal based on the retrieved carrier offset by applying the carrier offset correction to the received communication signal. The receiver is operative to synchronize to the carrier offset corrected received communication signal.

Another embodiment includes a method of receiving a wireless signal. The method includes sensing, by a temperature sensor, a temperature of a receiver, determining, by the receiver, that a communication signal being received is from a desired transmitter, determining, by the receiver, a carrier offset correction based on prior reception of communication signals from the desired transmitter, including retrieving a carrier offset of the desired transmitter from one or more stored carrier offsets based on previous communication with the desired transmitter and the sensed temperature of the receiver, receiving, by a receiver chain of the receiver, the communication signal from the desired transmitter, generating, by the receiver chain, a carrier offset corrected received signal based on the retrieved carrier offset by applying the carrier offset correction to the received communication signal, and synchronizing, by the receiver chain, to the carrier offset corrected received communication signal.

Another embodiment includes a method of receiving a wireless signal. The method includes determining, by the receiver, that a communication signal being received is from a desired transmitter, determining, by the receiver, a carrier offset correction based on prior reception of communication signals from the desired transmitter, comprising retrieving a timing offset of the desired transmitter from one or more stored timing offsets based on previous communication with the desired transmitter, receiving, by a receiver chain of the receiver, the communication signal from the desired transmitter, calculating a carrier offset correction based on the retrieved timing offset, generating, by the receiver chain, a carrier offset corrected received signal based on the retrieved carrier offset by applying the carrier offset correction to the received communication signal, and synchronizing, by the receiver, to the carrier offset corrected received communication signal.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for improving receiver performance in the presence of impairments, and variations in carrier frequencies. The disclosed embodiments overcome the aforementioned disadvantages of prior solutions by using a priori information about impairments based on previous communication with devices transmitting the signal of interest. Using the a priori information, efficient/accurate impairment mitigation is achieved, thereby enabling improved reception of signals of interest from a desired transmitter.

Figure 1:
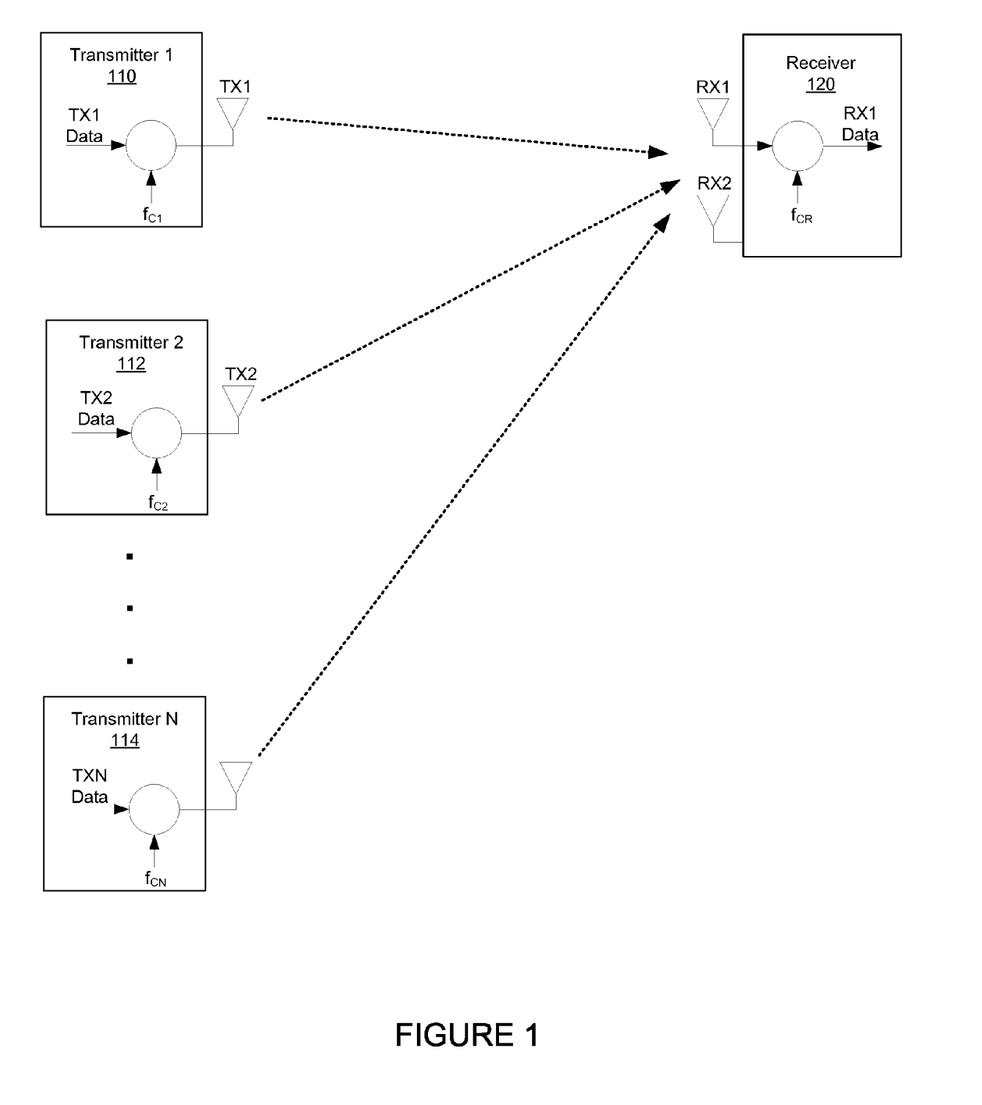
FIG. 1 shows an example multiple transmitters, wherein each transmitter has its own carrier frequency, and a receiver that has its own carrier frequency, according to an embodiment.

FIG. 1 shows an example multiple transmitters, wherein each transmitter 110, 112, 114 has its own carrier frequency, and a receiver 120 that has its own carrier frequency, according to an embodiment. As shown, transmitters 1 through N (110, 112, 114) each include a carrier frequency $f_{C1}$, $f_{C2}$, $f_{CN}$ which can be slightly offset from the carrier frequency $f_{CR}$ of the receiver 120. The differences in the offset frequencies can be due, for example, to clock frequencies of the transmitters 110, 112, 114 being slightly difference than a clock frequency of the receiver 120. Therefore, typically, the carrier frequency $f_{CR}$ of the receiver 120 has an offset frequency relative to the carrier frequencies $f_{C1}$, $f_{C2}$, $f_{CN}$ of the transmitters 110, 112, 114. An absolute value of ($f_{CR}$-$f_{CN}$) is typically within a determinable range.

Wireless signals are typically transmitted in bursts of data denoted as packets. The receiver must first detect the actual start of the packet. For WLAN systems, the transmitted packets contain a preamble at the start of the packet. Since the preamble sequence is known at the receiver, the receiver may correlate the received signal with the known preamble sequence and search for a correlation peak that exceeds a threshold. However, when there is a carrier offset present in the baseband signal due to the clock frequency difference between the transmitter and receiver, the correlation between the received signal and the known preamble sequence is effectively reduced. Thus, due to the inadequate accuracy of the synchronization based on cross-correlation, the receiver may use autocorrelation of the received signal to detect the start of the packet as illustrated in the equations below:

$$\text{Received signal: } y_k = e^{j(\omega_0 k + \varphi)}\left(\sum_{i=0}^{M-1} x_{k-i} h_i + n_k\right) \quad \text{(Eqn. 1)}$$

$$\text{AutoCorrelation: } R_{yy} = \sum_{i=0}^{N-1} y_{k+i} y^*_{k+i+L} \quad \text{(Eqn. 2)}$$

$$\text{Signal Square Power: } P_y = \sum_{i=0}^{N-1} |y_{k+i} y^*_{k+i}|^2 \quad \text{(Eqn. 3)}$$

$$\text{Threshold Check: } \frac{|R_{yy}|^2}{P_y} > \gamma_{CS} \quad \text{(Eqn. 4)}$$

where
$y_k$ is the received signal at time index k,
$x_k$ is the transmitted signal at time index k,
$h_{0 \ldots M-1}$ is a length M sequence representing the wireless channel impulse response,
$n_k$ is the noise sample at time index k,
$\omega_0$ is the carrier offset in radians per sample present in the received signal with respect to the transmitted baseband signal,
$S_{0 \ldots N-1}$ is a length N sequence which represents multiple periods of the base L-STF sequence,
$R_{yy}$ is the autocorrelation of the received signal with a lag of length L,
$P_y$ is the squared power of the received signal over the length of the correlation
$\gamma_{CS}$ is a threshold used for comparing the against the normalized correlation However, the autocorrelation approach is susceptible to poor detection probability/accuracy in low SNR (Signal to Noise Ratio), severe multipath and interference environments.

Figure 2:
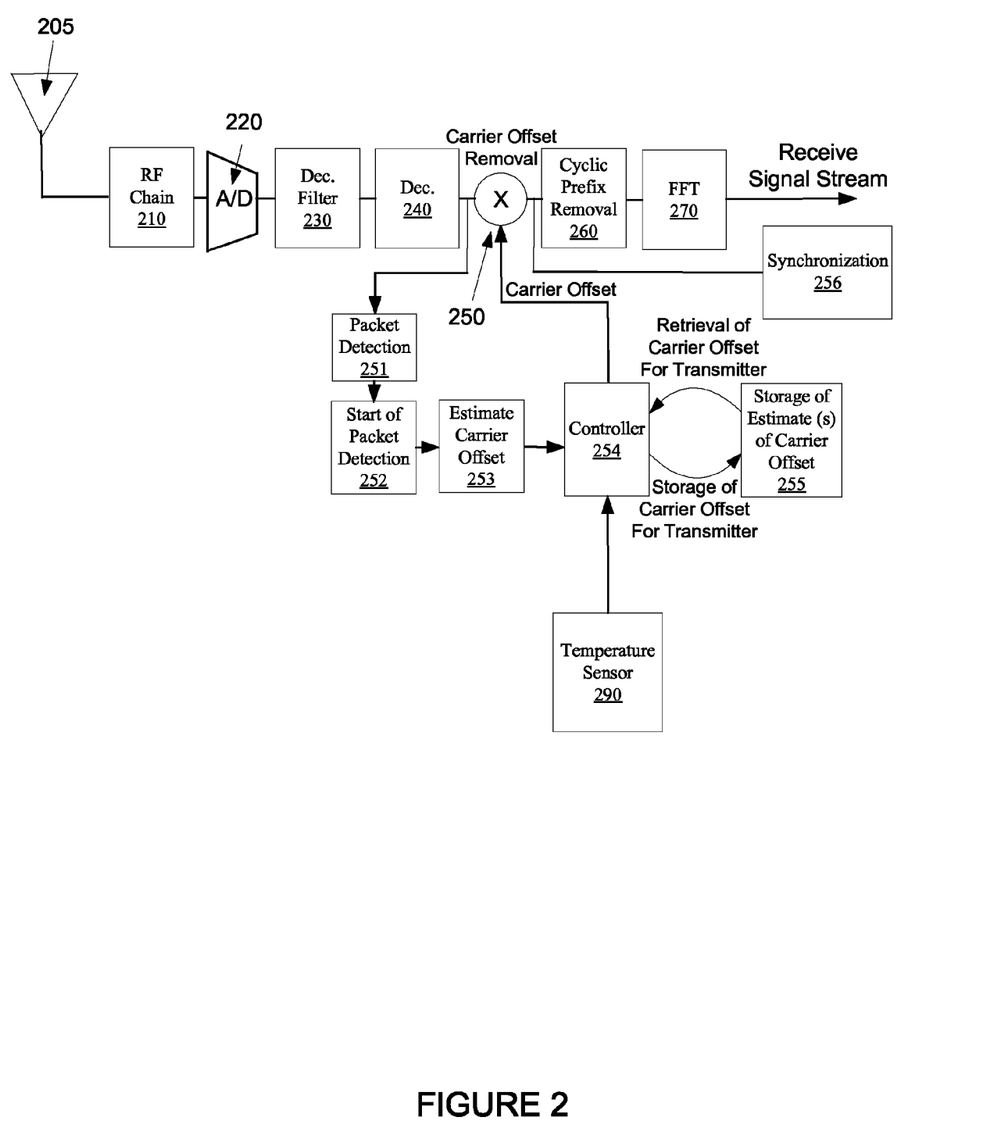
FIG. 2 shows a receiver that includes carrier offset correction of a received signal, according to an embodiment.

FIG. 2 shows a receiver that includes carrier offset correction of a received signal, according to an embodiment. The receiver includes an antenna 205, and RF chain 210 (that includes, for example, frequency down-conversion (coarse frequency down-conversion) of the received signal), an analog-to-digital converter (ADC) 220, a decimation filter 230, and a decimator 240.

For this embodiment, after decimation (240) the carrier offset present in the signal is mitigated by the injection of the negative of an estimate of the carrier offset. Generally, the mixer present in the RF chain provides a coarse frequency down-conversion resulting in a signal with a residual carrier offset which is subsequently estimated and removed in the baseband receiver. For example, mixer 250 removes the estimated carrier offset from the baseband received signal. After mitigation of the carrier offset, the symbol boundaries of the receive signal can more easily be detected. That is, the received signal can more easily be synchronized (256) to by the receiver.

For a received packet prior to a presently received packet, the carrier offset of the received signal is determined (packet detection 251, start of packet detection 252, estimate of carrier offset 253). For embodiments, the carrier offset estimation is performed during the preamble portion of a received packet (for example, the prior packet). Typically, the preamble consists of a periodic signal, in which the contents and periodicity or the periodic signal is known by the receiver. The receiver may perform a correlation of the received signal with a lag (i.e. delay) of N samples of the same signal where N is an integer multiple of the period of the preamble signal. The correlation is performed over a length of L samples. Equation 2 shows an example of the correlation. The angle of the complex valued sum of the correlation divided by the lag, L, provides an estimate of the effective carrier offset or drift per baseband sample.

A controller 254 then stores the determined carrier offset correction for a signal received from a particular transmitter in carrier offset storage 255. For correcting (mitigating), the carrier offset in the present packet, the controller 254 determines which transmitter the receiver is receiving a signal from, and then accesses the previously determined carrier offset correction from the carrier offset storage 255. The retrieved carrier offset correction is then used to mitigate the carrier offset of the presently received packet.

Various embodiments for identifying the desired transmitter can be utilized. That is, various embodiments can be utilized to determine that the received signal was transmitter from the desired transmitter. For an embodiment, a transmission reservation is set up at the MAC layer by the desired transmitter to the receiver and therefore the MAC management entity can communicate this knowledge to the PHY receiving device that the subsequent traffic for a specified time interval is transmitted by the desired transmitter. For a time interval following the reception of the most recent packet, the subsequent packet may be presumed to be transmitted by the same transmitter which transmitted the most recent received packet. If the density of proximate devices is not that high, a pair of devices may communicate on a predetermined channel. Therefore, when the receiving device is set to a particular channel, the receiver may use a lookup table (which is programmable/dynamic) to determine the device which transmits the packets on the current channel.

For an embodiment, once the carrier offset has been estimated, the residual carrier offset is removed from the received signal. The received baseband signal is multiplied (for example, through the use of mixer 250) by a carrier offset removal signal which includes a sine wave that is repeated with a frequency corresponding to the negative of the measured or estimated carrier offset, as depicted in the follow equations 5 and 6.

If the receiver knows a priori the identification of the transmitter device, the receiver can use prior estimate of the carrier offset based on reception of previous packets from that transmitter device. The carrier offset typically varies very slowly over time, mainly due to temperature variations causing clock frequency variation in the transmitters and receivers respectively. Therefore, the carrier offset may be updated over time and maintained per link (i.e. for each device that the receiver is receiving signals from). When the receiver is receiving from a particular device, the corresponding carrier offset estimate can be used and the negative of this carrier offset can be applied to the received signal effectively removing the carrier offset from the signal. Since the carrier offset has been effectively removed, the aforementioned method of cross-correlating the received signal with the known preamble can be used to improve the packet start detection even in low SNRs and interference environments. The equations below illustrate the application of the negative of the carrier offset estimate.

The equations below further illustrate this point:

$$\text{Received signal: } y_k = e^{j(\omega_0 k + \varphi)} \left( \sum_{i=0}^{M-1} x_{k-i} h_i + n_k \right) \quad \text{(Eqn. 5)}$$

$$\text{Cross Correlation: } R_{xy} = \sum_{i=0}^{N-1} y_{k+i} s_i^* e^{-j\hat{\omega} i} \quad \text{(Eqn. 6)}$$

$$\text{Signal Square Power: } P_y = \sum_{i=0}^{N-1} |y_{k+i} s_i^*|^2 \quad \text{(Eqn. 7)}$$

$$\text{Threshold Check: } \frac{|R_{xy}|^2}{P_y} > \gamma_{FS} \quad \text{(Eqn. 8)}$$

where $y_k$ is the received signal at time index k, $x_k$ is the transmitted signal at time index k, $h_{0 \ldots M-1}$ is a length M sequence representing the wireless channel impulse response, $\omega_0$ is the carrier offset in radians per sample present in the received signal with respect to the transmitted baseband signal, $n_k$ is the noise sample at time index k, $S_{0 \ldots N-1}$ is a length N sequence which represents some subset of the known preamble sequence, $R_{xy}$ is the cross correlation between the received signal and known preamble, $P_y$ is the squared power of the received signal and known preamble signal over the length of the correlation, $\gamma_{FS}$ is a threshold used for comparing the against the normalized correlation, $\hat{\omega}$ is the estimated carrier offset in radians per sample If $\hat{\omega}$ is a reasonable estimate of the actual carrier offset $\omega_0$, then the cross-correlation peak will not be degraded thereby improving the accuracy of start of packet and OFDM symbol boundary detection.

The robustness of this packet detection can be further improved by simultaneous use of the autocorrelation and cross-correlation methods. The correlations from both methods can be used to determine the packet start.

If the received signal is a multi-carrier signal, such as, an OFDM (orthogonal frequency division multiplexing) signal, the packet start detection is also used to establish the OFDM symbol boundary in the received signal. At this point, the receiver needs to estimate the channel. When the carrier offset is solely estimated during reception of the packet, the channel estimation must be delayed until accurate carrier offset computation is completed. This computation results in increased latency at the receiver as well as additional buffering of the received data. However, with a priori carrier offset estimates, the latency can be minimized and channel estimation and the rest of the receiver processing can be accomplished faster.

FIG. 2 further includes a temperature sensor 290 that enables the controller 254 to determine a temperature of the receiver. For at least some embodiments, the carrier offset between a transmitter and the receiver varies over time due to the temperature at each device. That is, the $\omega_0$ (carrier offset in radians per sample) present in the receive signal with respect to the transmitted baseband signal of Equation 5 is a function of, for example, the receiver.

For low power applications (for example with remote sensors), the receiver may be turned on and off periodically. Thus, the temperature on the low power device could fluctuate resulting in a higher likelihood of the carrier offset varying over time. One approach to compensating for this variation is to update the carrier offset during the packet to refine the estimate. However, this process of updating the carrier offset consumes power. An alternative solution that saves power is predicated on the idea of storing/recalling a carrier offset corresponding to the current temperature of the device or receiver.

Initially, when traffic is received from a particular device (transmitter), there is no a priori carrier offset estimate. At this point, the carrier offset must be estimated using the estimation procedures described previously. For at least some embodiments, the temperature sensor 290 on the receiver is used to measure the temperature of the receiver. For at least some embodiments the temperature sensor is located within a RFIC (radio frequency integrated circuit) of the receiver. For at least some embodiments, the temperature sensor is located proximate to a voltage controlled crystal oscillators (VCXO) of the receiver, wherein the VCXO is used to driver the mixer 250, which in turn determines the carrier offset.

For at least some embodiments, the carrier offset estimate is stored along with the corresponding temperature measurement. Over time, a table (stored within, for example, the carrier offset storage 255) can be created where carrier offsets are stored for each predefined temperature range (over some reasonable operating range of temperatures). Subsequently, for at least some embodiments, when the receiver is communicating with a known device (where carrier offsets have been estimated/stored), the current temperature is obtained from the temperature sensor and the carrier offset is determined from the table entry corresponding to the temperature range which includes the current measured temperature. This temperature based table lookup of the carrier offset provides a more accurate carrier offset measurement and reduces the need to update the carrier offset through the packet.

For an embodiment, the controller 254 of the receiver is operative to determine a carrier offset correction based on prior reception of communication signals from the desired transmitter, which includes retrieving a carrier offset of the desired transmitter from one or more stored carrier offsets based on previous communication with the desired transmitter and a temperature of the receiver. As previously stated, the temperature sensor 290 is operative to sense the temperature of the receiver. For an embodiment, the carrier offset is retrieved from memory. For an embodiment, the one or more carrier offsets are retrieved from memory.

For an embodiment, before determining a current carrier offset, the receiver stores the one or more carrier offsets in memory. For an embodiment, this includes sensing, by the temperature sensor 290, a temperature of the receiver while receiving a communication signals from the desired transmitter, estimating the carrier offset for the desired transmitter with the receiver at the sensed temperature, and storing the estimated carrier offset for the desired transmitter with the receiver at the sensed temperature.

For an embodiment, the receiver stores the one or more carrier offsets in memory. For an embodiment, this includes sensing, by the temperature sensor, a temperature of the receiver while receiving a communication signals from one or more other transmitters, estimating carrier offsets for each of the one or more other transmitters with the receiver at the sensed temperature, and storing the estimated carrier offsets for each of the one or more other transmitters with the receiver at the sensed temperature.

For at least some embodiments, the estimated carrier offset is stored in the memory according to ranges of sensed temperature. For at least some embodiments, a number of the ranges of temperature is dependent upon a variation in the carrier offset with temperature of the receiver.

An embodiment includes retrieving the carrier offset based on a temperature of the desired transmitter. That is, rather than just compensating for the carrier offset based on the temperature of the receiver, at least some embodiment additionally or alternatively compensate for the carrier offset based on the temperature of the transmitter. For an embodiment, the temperature information of the transmitter is obtained by the receiver through information sent or transmitted to the receiver. For an embodiment, the temperature of the transmitter is obtained by the receiver through a priori knowledge. For an embodiment, the transmitter periodically sends temperature measurements to the receiver to ensure that the receiver has a reasonably accurate measurement of the transmitter device's current temperature. For an embodiment, the transmission is performed as a separate packet or included with the transmission of other data traffic.

An embodiment further includes aging the one or more carrier offsets of the memory, and upon a determined age, re-estimating and re-storing the one or more carrier offsets in the memory. For an embodiment, the estimates for each temperature range are aged. For an embodiment, the one or more carrier offset are re-estimated after an adaptively selected or a preselected age and/or time. The aging of the carrier offsets is predicated on the concept that the a priori carrier offset may not be accurate. For example, the transmitter's temperature may have changed a more current estimate is needed, or the desired transmitter may be different.

As previously described, for an embodiment, the controller is further operative to estimate a first timing offset of a currently received packet of the received communication signal, compute a second timing offset based on the determined carrier offset correction offset, compare the estimated first timing offset with the computed second timing offset, and determine that the currently received packet is not transmitted from the desired transmitter if an absolute value of a difference between the estimated first timing offset and the computed second timing offset is greater than a threshold. If the same clock source is used to drive the mixer as well as the DAC/ADC, then there will be a proportional relationship between the timing and carrier offset as shown below:

$$\Delta f_s = (\omega_0 / 2\pi) * \left(\frac{f_s}{f_c}\right),$$

where $\Delta f_s$ is the timing offset for the sampling rate $f_s$ (in Hz), and $f_c$ is the carrier frequency (in Hz), and $\omega_0$ is the carrier offset in radians per sample.

For at least some embodiments, if the timing offset is determined based on the a priori methods described, then the carrier offset is derived using the a priori timing offset estimate and the relationship shown above. Conversely, for at least some embodiments, when the carrier offset is determined using the a priori methods described, the timing offset is derived using the a priori carrier offset estimate and the relationship shown above.

Figure 3:
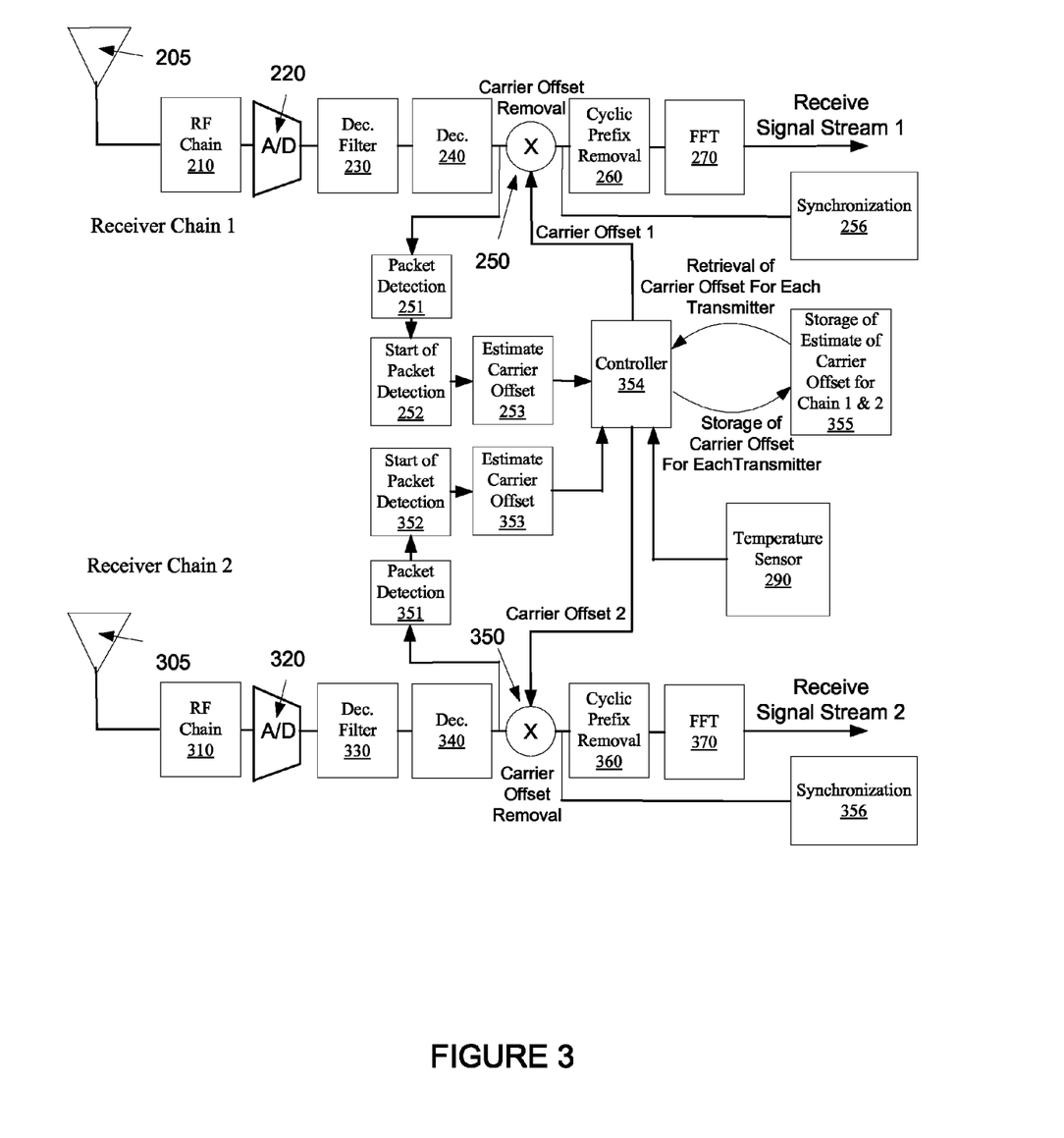
FIG. 3 shows a receiver that includes multiple receiver chains, wherein the receiver generates a carrier offset correction for a receive signal of each of the receiver chains, according to an embodiment.

FIG. 3 shows a receiver that includes multiple receiver chains, wherein the receiver generates a carrier offset correction for a receive signal of each of the receiver chains, according to an embodiment. The multiple receiver chain receiver can be utilized, for example, in multiple-input, multiple-output (MIMO) wireless systems. While only two receiver chains are shown, it is to be understood that the receiver can include any number of receiver chains.

In MIMO systems, the received signals from all receiver chains typically contains the same carrier offset with respect to the transmitted signals since there is typically one clock source for each device. Therefore, the method of utilizing the a priori knowledge of the carrier offset can be applied to the received signals of all receiver chains thereby improving the synchronization robustness of each received signal. (Note: In MIMO signals, the synchronization or packet start detection typically utilizes the correlation information from all receiver chains to improve the overall robustness and detection accuracy).

As shown, a second receiver chain includes an antenna 305, and RF chain 310 (that includes, for example, frequency down-conversion (coarse frequency down-conversion) of the received signal), an analog-to-digital converter (ADC) 320, a decimation filter 330, and a decimator 340.

For this embodiment, after decimation (340) the carrier offset is mitigated by the addition of a carrier offset signal (Carrier Offset 2). Generally, the carrier offset signal provides a fine, or residual frequency down-conversion for adjusting the carrier offset (utilizing, for example, a mixer 350). After mitigation of the carrier offset, the symbol boundaries of the receive signal can more easily be detected. That is, the received signal can more easily be synchronized (356) to by the receiver.

For a received packet prior to a presently received packet, the carrier offset of the received signal is determined (packet detection 351, start of packet detection 352, estimate of carrier offset 353). For embodiments, the carrier offset estimation is performed during the preamble portion of a received packet (for example, the prior packet).

A controller 354 then stores the determined carrier offset correction for a signal received from a particular transmitter in carrier offset storage 355. As shown, a temperature sensor 290 measures the temperature of the receiver. As described, for at least some embodiments, the controller 354 stores the determined carrier offset correction for a signal received from a particular transmitter at a measure temperature of the receiver, in carrier offset storage 355. Alternatively, or additionally, the previously described look-up-table (LUT) includes transmitter and receiver temperature ranges.

For correcting (mitigating) the carrier of the present packet, the controller 354 determines which transmitter the receiver is receiving a signal from, and then accesses the previously determined carrier offset correction from the carrier offset storage 355. The retrieved carrier offset correction is then used to mitigate the carrier offset of the presently received packet. While there are two carrier offsets shown in the Figure, offset 1 and offset 2, these values could be the same if the receiver is receiving signals from a single transmitter device. If the receiver is receiving from more than one transmitter, each receiver chain may apply a different carrier offset correction corresponding to previously estimated carrier offsets with respect to different transmitters.

Figure 4:
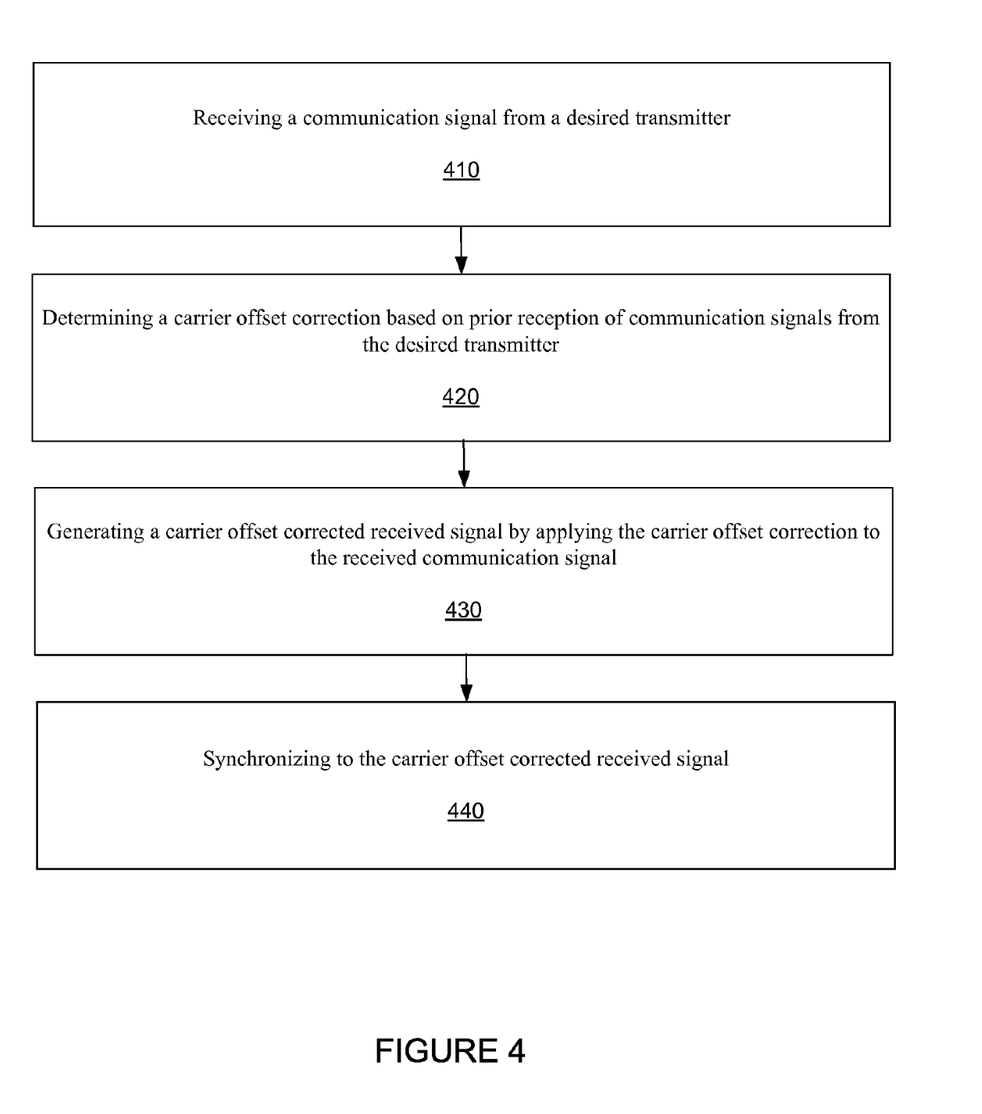
FIG. 4 is a flow chart that includes steps of a method of receiving a wireless signal, according to an embodiment.

FIG. 4 is a flow chart that includes steps of a method of receiving a wireless signal, according to an embodiment. A first step 410 includes receiving a communication signal from a desired transmitter. A second step 420 includes determining a carrier offset correction based on prior reception of communication signals from the transmitter. A third step 430 includes generating a carrier offset corrected received signal by applying the carrier offset correction to the received communication signal. A fourth step 440 includes synchronizing to the carrier offset corrected received signal.

For embodiments, the carrier offset correction for the desired transmitter is determined from prior communication signals received from desired transmitter. The carrier offset correction can be estimated, for example, during the preamble portion of a received packet of the previously receives communication signal of the desired transmitter. Typically, the preamble consists of a periodic signal, wherein the contents and periodicity of the periodic signal is known by the receiver. For an embodiment, the receiver performs a correlation of the received signal with a lag (i.e. delay) of N samples of the same signal where N is an integer multiple of the period of the preamble signal. For embodiments, the correlation is performed over a length of L samples. For embodiments, the angle of the complex valued sum of the correlation is divided by the lag, L, which provides an estimate of the effective carrier offset or drift per baseband sample.

Once the carrier offset has been estimated, this residual carrier offset is removed from the received signal. As described, for embodiments, applying the carrier offset correction to the received communication signal includes multiplying the received signal by the carrier offset signal, wherein the carrier offset signal includes a sine wave that is repeated with a frequency corresponding to the negative of the measured or estimated carrier offset.

For an embodiment, synchronizing to the carrier offset corrected received signal, includes correlating the carrier offset corrected received communication signal with a known sequence. For embodiments, synchronization includes a process of determining the start of a packet and more specifically, in the case of OFDM received signals, the symbol boundary of each OFDM symbol.

An embodiment further includes estimating a carrier offset of a currently received packet of the received communication signal, comparing the estimated carrier offset of the currently received packet with the determined carrier offset correction, and determining that currently received packet is not transmitted from the desired transmitter if a difference between the estimated carrier offset of the currently received packet and determined carrier offset correction is greater than a threshold. Further, embodiments include not acting upon the received signal if determined not to be received from a desired transmitter.

Another embodiment includes estimating a first timing offset of a currently received packet of the received communication signal, computing a second timing offset based on the determined carrier offset correction offset (Note: alternatively, this computation can be based on the determined carrier offset correction based on prior reception of communication signals from the desired transmitter), comparing the estimated first timing offset with the computed second timing offset, and determining that the currently received packet is not transmitted from the desired transmitter if a difference between the estimated first timing offset and the computed second timing offset is greater than a threshold. The computed timing offset may be calculated from the carrier offset correction in the following manner. Typically, the carrier and sampling rate frequencies are derived from the same clock on a transmitter or receiver. Therefore, a numerical relationship exists between the carrier and timing drift from the respective nominal carrier and sampling frequencies. Specifically, the sampling rate deviation or equivalently the timing offset is smaller by a factor of $f_c/f_s$ compared to the carrier offset where $f_c$ corresponds to the nominal carrier frequency of the mixer and $f_s$ corresponds to the nominal sampling rate of the DAC (transmitter) or ADC (receiver).

An embodiment further includes determining which of a plurality of transmitters the receiver is receiving the communication signal from, and accessing a corresponding carrier offset correction based upon the determination of which of the plurality of transmitters the receiver is receiving the communication signal from. As previously described, the determination of which of the plurality of transmitters the receiver is receiving the communication signal from can be determined utilizing various methods. For an embodiment, a transmission reservation is set up at the MAC layer by the desired transmitter to the receiver and therefore the MAC management entity can communicate this knowledge to the PHY receiving device that the subsequent traffic for a specified time interval is transmitted by the desired transmitter. For a time interval following the reception of the most recent packet, the subsequent packet may be presumed to be transmitted by the same transmitter which transmitted the most recent received packet. If the density of proximate devices is not that high, a pair of devices may communicate on a predetermined channel. Therefore, when the receiving device is set to a particular channel, the receiver may use a lookup table (which is programmable/dynamic) to determine the device which transmits the packets on the current channel.

For an embodiment, the communication signal includes a present packet, and the carrier offset correction is determined from a prior packet received within the prior reception from the transmitter. An embodiment includes re-determining the carrier offset correction.

An embodiment further includes receiving a plurality of communication signals through a plurality of receiver chains, wherein each receiver chain includes an antenna. A specific embodiment further includes a first receiver chain of the plurality of receiver chains receiving a first communication signal from a first transmitter, and a second receiver chain of the plurality of receiver chains receiving a second communication signal from a second transmitter, wherein the first receiver chain applies a first carrier offset correction to the first communication signal, and the second receiver chain applies a second carrier offset correction to the second communication signal. A specific embodiment further includes the receiver determining the first carrier offset correction based on previously received first communication signals, and determining the second carrier offset correction based on previously received second communication signals. A specific embodiment further includes the receiver identifying each one of N communication signals received through the plurality of receiver chains, accessing a corresponding one of N carrier offset corrections for each of the N communication signals, and applying the corresponding one of the N carrier offset corrections to each of the received N communication signals. A specific embodiment further includes each one of the N communication signals being received over at least one corresponding receiver chain, wherein the corresponding receiver chain applies a corresponding one of N carrier offset corrections.

When there are more than N devices with which the receiver may be receiving desired signals, embodiments of the receiver decides which N carrier offsets corrections to apply to each of the chains. An embodiment includes choosing the carrier offset corrections corresponding to the N devices that the receiver has been receiving the most traffic/packets over some time period. Another embodiment includes choosing the carrier offset corrections corresponding to the N devices whose packets have been received with the lowest average SNR over some time period. Another embodiment includes determining the minimum and maximum carrier offset correction for all devices which have communicated with the receiver and choose a distribution of N carrier offset corrections such that the resulting minimum residual carrier offset for a packet received from any device (i.e. the minimum of the absolute value of the N differences between the actual carrier offset and the N carrier offset corrections on the N chains) is not greater than some threshold. If this condition is satisfied, the residual carrier offset may be small enough that the cross-correlation peaks are not sufficiently reduced thereby still enabling good synchronization performance.

Figure 5:
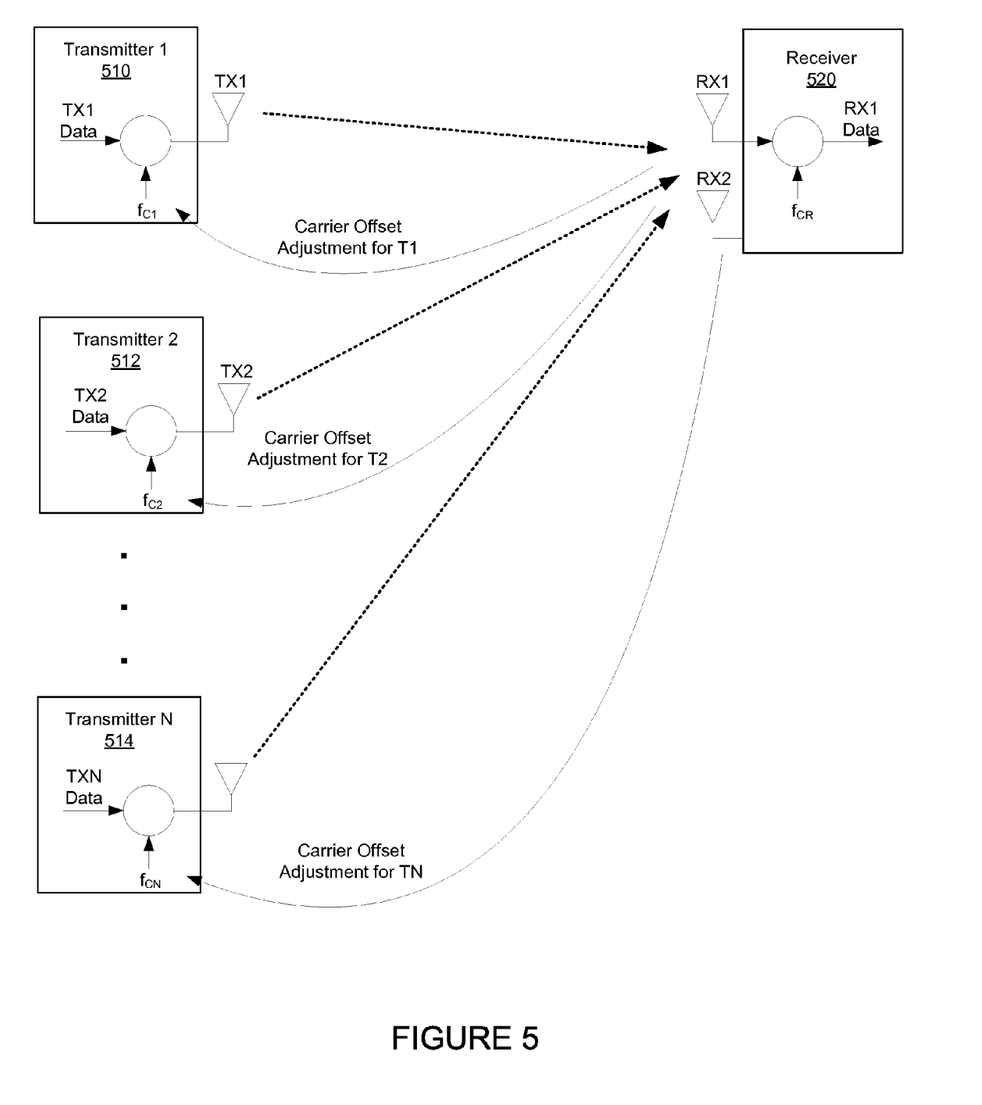
FIG. 5 shows a wireless system that includes multiple transmitters and a receiver that includes transmitter carrier offset adjustments and a receiver carrier offset correction, according to an embodiment.

FIG. 5 shows a wireless system that includes multiple transmitters 510, 512, 514 and a receiver 520, that includes transmitter carrier offset adjustments and a receiver carrier offset correction. As shown, the receiver 520 provides a carrier offset adjustment for each of the transmitters 510, 512, 514. The carrier offset adjustments for the transmitters 510, 512, 514 can be selected to improve the carrier offset of the desired one of the transmitters, and can alternatively or additionally be selected to reduce interfering properties of the transmitters that are not intended for reception by the receiver 520.

As previously described, the multiple receiver chains of the receiver 520 can be utilized to receive communications signals from multiple transmitters, wherein each chain receives communication signals from a specific transmitter, and correspondingly, selects a carrier offset correction that corresponds with that specific transmitter. For this embodiment, each receiver chain of a multiple chain receiver is optimized to receive a signal from a different device. If there are N receive chains, each of the received signals could be processed with carrier offset removal based on a different a priori carrier offset estimate corresponding to up to N different transmit devices. Upon start of packet detection by a particular receiver chain, all receiver chains could then apply the carrier offset estimate used for carrier offset removal by that receiver chain which detected a start of packet.

Further, carrier offset adjustments can be provided to multiple transmitters for the purposes of reducing the interference caused by transmitters that the receiver is not receiving communications signals from. The improved interference mitigation using this technique can be illustrated with an example. Assume that there are two transmit devices in the proximity of a receiver. The transmit device transmitting the desired signal to the receiver has a carrier frequency denoted as $f_D$ and the transmit device transmitting the interference signal has a carrier denoted as $f_I$. The receiver has a carrier frequency denoted as $f_R$. The interferer may adjust its carrier $f_I$ such that the following equation is satisfied:

$$\text{Received interference signal: } y_k = e^{j(\omega_I k + \phi)}(\Sigma_{j=0}^{M-1} x_{k-j} h_j + n_k) \quad \text{(Eqn. 9)}$$

$$\text{Estimated interference carrier: } \hat{\omega}_I = \min_{\omega_I} \max_k |\Sigma_{i=0}^{N-1} y_{k+i} s_i^* e^{-j\omega_I i}| \quad \text{(Eqn. 10)}$$

$\hat{\omega}$ is the estimated carrier offset between the transmitter of the desired signal and the receiver in radians per sample $\omega_I$ represents a candidate value (in some allowable range) for the carrier offset between the interferer and the receiver in radians per sample $\omega_I$ is the chosen optimum carrier offset between the interferer and receiver in radians per sample from the set of candidate values Thus, $f_I = f_R + f_s \hat{\omega}_I / 3\pi$, where $f_s$ is the sampling rate of the baseband signal at the receiver in samples/sec. The above optimization may be performed at the receiver and communicated to the interferer. Alternatively, the interferer could receive signals sent between the transmitter and receiver and derive the optimum carrier offset by using similar processing to that shown above.

The aforementioned approach for selecting a carrier to mitigate interference could be extended to a network of many devices. Each receiving device could determine the set of all transmitters whose signals arrive at the receiver with signal strength above a threshold. If the receiver determines that some of those signals are being transmitted by interferers, the receiver could communicate a recommended carrier value to be used by each interferer. Each interfering device could then adjust its carrier to that value. For a high density of devices, a central controller could determine the best carrier values to be used by all devices in the network based on knowledge of approximate location of the various devices as well as the desired signals to be received by each device.

Other Embodiments

Analogous to the use of carrier offset, a priori estimates of noise/interference profiles (for example, a noise/interference power estimate per OFDM tone) may be utilized to improve the detection/decoding of the received signal. For example, if the noise profile indicates power on certain tones above a threshold, the synchronization may resort to only using the cross-correlation approach for detecting start of packet rather than the autocorrelation approach. Additionally, the carrier offset estimation itself may be implemented only using the tones with noise power below a threshold (since the high noise power may corrupt the carrier offset estimate thereby degrading performance for current as well as subsequent packets if the estimate is used in subsequent packets as an a priori estimate).

Figure 6:
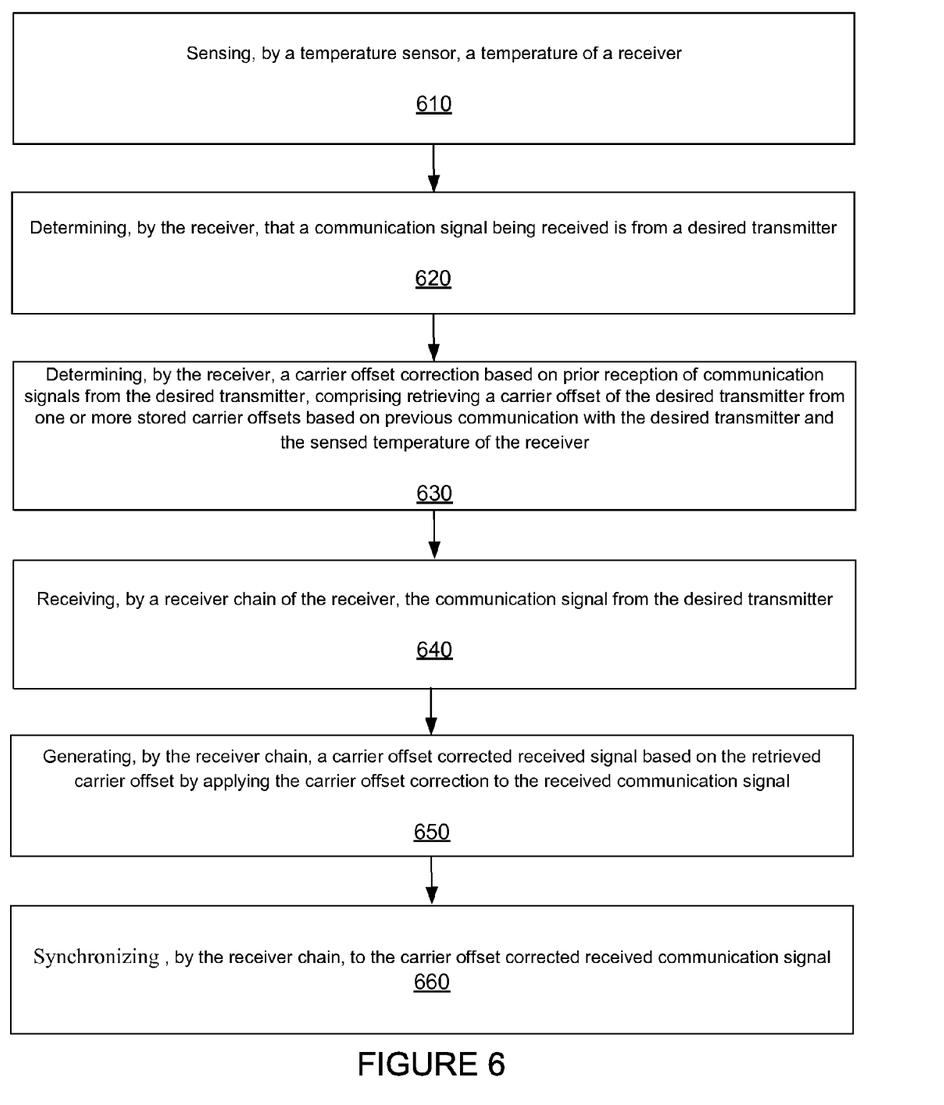
FIG. 6 is a flow chart that includes steps of a method of receiving a wireless signal, according to another embodiment.

FIG. 6 is a flow chart that includes steps of a method of receiving a wireless signal, according to another embodiment. A first step 610 includes sensing, by a temperature sensor, a temperature of a receiver. A second step 620 includes determining, by the receiver, that a communication signal being received is from a desired transmitter. A third step 630 includes determining, by the receiver, a carrier offset correction based on prior reception of communication signals from the desired transmitter, comprising retrieving a carrier offset of the desired transmitter from one or more stored carrier offsets based on previous communication with the desired transmitter and the sensed temperature of the receiver. A fourth step 640 includes receiving, by a receiver chain of the receiver, the communication signal from the desired transmitter. A fifth step 650 includes generating, by the receiver chain, a carrier offset corrected received signal based on the retrieved carrier offset by applying the carrier offset correction to the received communication signal. A sixth step 660 includes synchronizing, by the receiver chain, to the carrier offset corrected received communication signal.

As previously described, for an embodiment, the carrier offset is retrieved from memory. As previously described, for an embodiment, the one or more carrier offsets are retrieved from memory.

As previously described, at least some embodiments further include storing the one or more carrier offsets in memory. For an embodiment, storing the one or more carrier offsets in memory includes sensing, by the temperature sensor, a temperature of the receiver while receiving a communication signals from the desired transmitter, estimating the carrier offset for the desired transmitter with the receiver at the sensed temperature, and storing the estimated carrier offset for the desired transmitter with the receiver at the sensed temperature.

As previously described, at least some embodiments further include storing the one or more carrier offsets in memory. For an embodiment, storing the one or more carrier offsets in memory includes sensing, by the temperature sensor, a temperature of the receiver while receiving a communication signals from one or more other transmitters, estimating carrier offsets for each of the one or more other transmitters with the receiver at the sensed temperature, and storing the estimated carrier offsets for each of the one or more other transmitters with the receiver at the sensed temperature.

Figure 7:
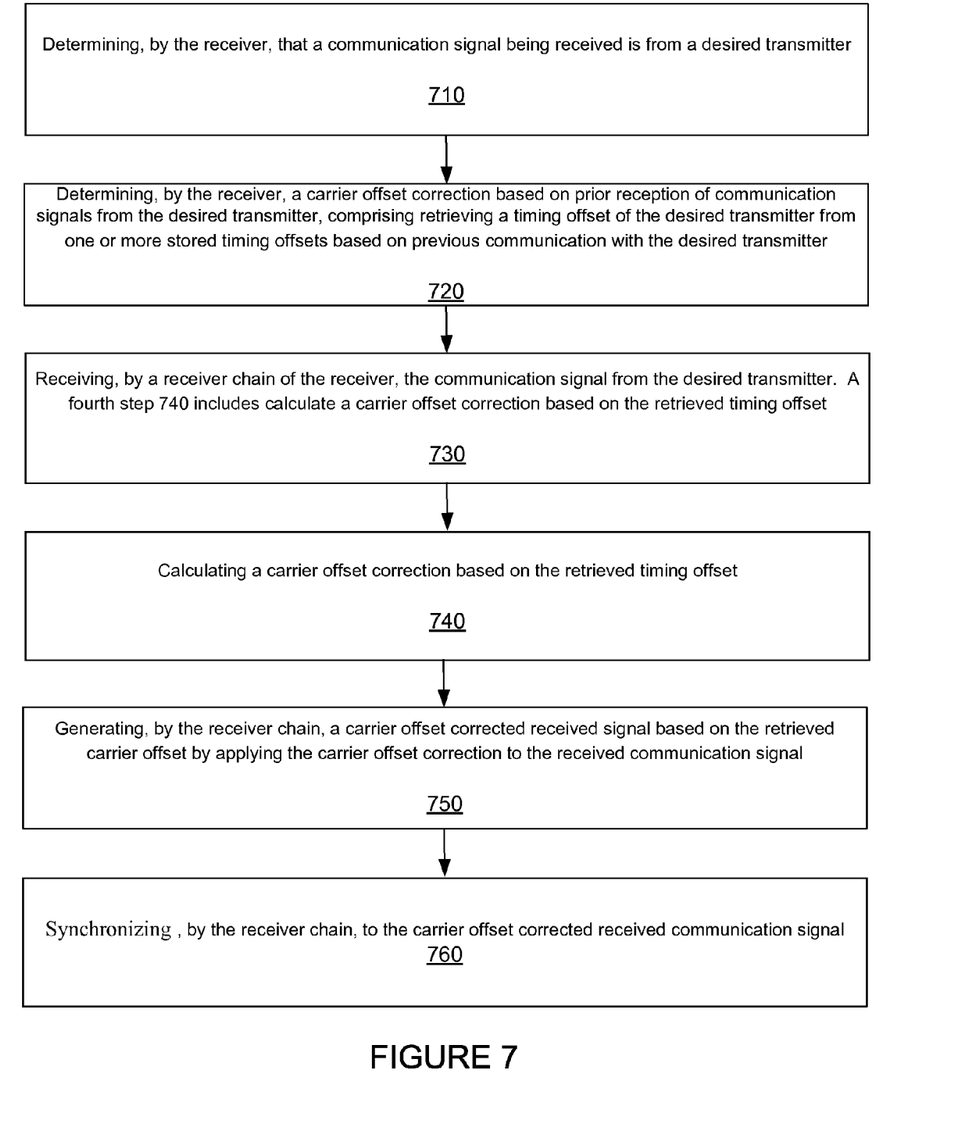
FIG. 7 is a flow chart that includes steps of a method of receiving a wireless signal, according to another embodiment.

FIG. 7 is a flow chart that includes steps of a method of receiving a wireless signal, according to another embodiment. A first step 710 includes determining, by the receiver, that a communication signal being received is from a desired transmitter. A second step 720 includes determining, by the receiver, a carrier offset correction based on prior reception of communication signals from the desired transmitter, comprising retrieving a timing offset of the desired transmitter from one or more stored timing offsets based on previous communication with the desired transmitter. A third step 730 includes receiving, by a receiver chain of the receiver, the communication signal from the desired transmitter. A fourth step 740 includes calculate a carrier offset correction based on the retrieved timing offset. A fifth step 750 includes generating, by the receiver chain, a carrier offset corrected received signal based on the retrieved carrier offset by applying the carrier offset correction to the received communication signal. A sixth step 760 includes synchronizing, by the receiver, to the carrier offset corrected received communication signal. Further, at least some embodiments further includes sensing, by a temperature sensor, a temperature of the receiver, wherein the controller determining the carrier offset correction based on the prior reception of communication signals from the desired transmitter, comprises retrieving the timing offset of the desired transmitter from the one or more stored timing offsets based on the previous communication with the desired transmitter and based on the sensed temperature.

A semiconductor intellectual property core, such as a microprocessor core, or a portion thereof, fixed function circuitry, or configurable circuitry embodying the disclosure can be described in data stored on a machine readable medium. Such data can be in accordance with a Hardware Description Language (HDL), and may include Register Transfer Language (RTL) description data, for example. This descriptive data can be used to simulate, verify, and/or produce a specific implementation of the disclosure (e.g., an integrated circuit, or a combination of integrated circuit(s) and discrete components).

The disclosure explained example embodiments using block diagrams that, for example, show a flow of data through different functional blocks. To a person of ordinary skill in the relevant arts, the names given to these functional blocks also describe example structure for implementing those functions, without including unnecessary detail. These functional blocks can have varied implementations, including using fixed-function circuitry, partially configurable circuitry, special-purpose processors, such as digital signal processors, generally programmable processor cores, and combinations thereof. For example, some implementations may implement some of the depicted functional blocks using software configuring a processor, while others may use fixed-function circuitry. Since different implementations may use different physical hardware elements, the depiction of particular arrangements of functional blocks does not imply that implementations need to have separate structures implementing those functions. For example, a carrier offset estimator can be implemented as a separate circuit (such as, carrier offset estimator 253) from controller (processor) 254, but such a carrier offset estimator also could be implemented as a resource shared with other functional blocks, or an estimator driven by decoded instructions from a processor (such as, controller (processor) 254).

This disclosure explains that a processor can perform certain aspects of methods according to the disclosure. Such processor can be a generally programmable processor, which can execute machine readable code according to an instruction set architecture. Such processor also can have more limited configurability, such as allowing configurability using supplied sets of parameters that modify execution of a set of sub-routines available from a non-volatile memory, for example. The processor also can include fixed-function circuitry, which can interoperate with programmable or configurable elements of the processor. When such a processor is configured to perform a function or action described in the disclosure, the processor effectively becomes circuitry for performing that function or action, even while the processor also can be circuitry for performing other functions or actions. As such, the term "circuitry" does not imply a single electrically connected set of circuits, and circuitry may be fixed-function, configurable, or programmable.

Although specific embodiments have been described and illustrated, the embodiments are not to be limited to the specific forms or arrangements of parts so described and illustrated. The described embodiments are to only be limited by the claims.

What is claimed:

1. A receiver, comprising:
a controller operative to determine that a communication signal being received is from a desired transmitter;
the controller operative to determine a carrier offset correction based on prior reception of communication signals from the desired transmitter, comprising retrieving a carrier offset of the desired transmitter from one or more stored carrier offsets based on previous communication with the desired transmitter and a temperature of the receiver;
a receiver chain operative to receive the communication signal from the desired transmitter;
the receiver chain operative to generate a carrier offset corrected received signal based on the retrieved carrier offset by applying the carrier offset correction to the received communication signal; and
the receiver operative to synchronize to the carrier offset corrected received communication signal.

2. The receiver of claim 1, further comprising a temperature sensor operative to sense the temperature of the receiver.

3. The receiver of claim 1, wherein the carrier offset is retrieved from memory.

4. The receiver of claim 1, wherein the one or more carrier offsets are retrieved from memory.

5. The receiver of claim 3, further comprising storing the one or more carrier offsets in memory, comprising:
sensing, by the temperature sensor, a temperature of the receiver while receiving a communication signals from the desired transmitter;
estimating the carrier offset for the desired transmitter with the receiver at the sensed temperature; and
storing the estimated carrier offset for the desired transmitter with the receiver at the sensed temperature.

6. The receiver of claim 5, further comprising storing the one or more carrier offsets in memory, comprising:
sensing, by the temperature sensor, a temperature of the receiver while receiving a communication signals from one or more other transmitters;
estimating carrier offsets for each of the one or more other transmitters with the receiver at the sensed temperature; and
storing the estimated carrier offsets for each of the one or more other transmitters with the receiver at the sensed temperature.

7. The receiver of claim 5, wherein the estimated carrier offset is stored in the memory according to ranges of sensed temperature.

8. The receiver of claim 7, wherein a number of ranges of temperature is dependent upon a variation in the carrier offset with temperature of the receiver.

9. The receiver of claim 1, further comprising retrieving the carrier offset based on a temperature of the desired transmitter.

10. The receiver of claim 4, further comprising aging the one or more carrier offsets of the memory, and upon a determined age, re-estimating and re-storing the one or more carrier offsets in the memory.

11. The receiver of claim 1, wherein the controller is further operative to:
estimate a first timing offset of a currently received packet of the received communication signal;
compute a second timing offset based on the determined carrier offset correction offset;
compare the estimated first timing offset with the computed second timing offset; and
determine that the currently received packet is not transmitted from the desired transmitter if an absolute value of a difference between the estimated first timing offset and the computed second timing offset is greater than a threshold.

12. A receiver, comprising:
a controller operative to determine that a communication signal being received is from a desired transmitter;
the controller operative to determine a carrier offset correction based on prior reception of communication signals from the desired transmitter, comprising retrieving a timing offset of the desired transmitter from one or more stored timing offsets based on previous communication with the desired transmitter;
a receiver chain operative to receive the communication signal from the desired transmitter;
the receiver chain operative to calculate a carrier offset correction based on the retrieved timing offset;
the receiver chain operative to generate a carrier offset corrected received signal based on the retrieved carrier offset by applying the carrier offset correction to the received communication signal; and
the receiver operative to synchronize to the carrier offset corrected received communication signal.

13. The receiver of claim 12, further comprising:
a temperature sensor operative to sense a temperature of the receiver;
wherein the controller determining the carrier offset correction based on the prior reception of communication signals from the desired transmitter, comprises retrieving the timing offset of the desired transmitter from the one or more stored timing offsets based on the previous communication with the desired transmitter and based on the sensed temperature.

14. A method of receiving a wireless signal, comprising:
sensing, by a temperature sensor, a temperature of a receiver;
determining, by the receiver, that a communication signal being received is from a desired transmitter;
determining, by the receiver, a carrier offset correction based on prior reception of communication signals from the desired transmitter, comprising retrieving a carrier offset of the desired transmitter from one or more stored carrier offsets based on previous communication with the desired transmitter and the sensed temperature of the receiver;
receiving, by a receiver chain of the receiver, the communication signal from the desired transmitter;
generating, by the receiver chain, a carrier offset corrected received signal based on the retrieved carrier offset by applying the carrier offset correction to the received communication signal; and
synchronizing, by the receiver chain, to the carrier offset corrected received communication signal.

15. The method of claim 14, wherein the carrier offset is retrieved from memory.

16. The method of claim 14, wherein the one or more carrier offsets are retrieved from memory.

17. The method of claim 16, further comprising storing the one or more carrier offsets in memory, comprising:
sensing, by the temperature sensor, a temperature of the receiver while receiving a communication signals from the desired transmitter;

estimating the carrier offset for the desired transmitter with the receiver at the sensed temperature; and storing the estimated carrier offset for the desired transmitter with the receiver at the sensed temperature.

18. The method of claim 17, further comprising storing the one or more carrier offsets in memory, comprising:

sensing, by the temperature sensor, a temperature of the receiver while receiving a communication signals from one or more other transmitters;

estimating carrier offsets for each of the one or more other transmitters with the receiver at the sensed temperature; and storing the estimated carrier offsets for each of the one or more other transmitters with the receiver at the sensed temperature.

19. A method of receiving a wireless signal, comprising:

determining, by the receiver, that a communication signal being received is from a desired transmitter;

determining, by the receiver, a carrier offset correction based on prior reception of communication signals from the desired transmitter, comprising retrieving a timing offset of the desired transmitter from one or more stored timing offsets based on previous communication with the desired transmitter;

receiving, by a receiver chain of the receiver, the communication signal from the desired transmitter;

calculating a carrier offset correction based on the retrieved timing offset;

generating, by the receiver chain, a carrier offset corrected received signal based on the retrieved carrier offset by applying the carrier offset correction to the received communication signal; and synchronizing, by the receiver, to the carrier offset corrected received communication signal.

20. The method of claim 19, further comprising:

sensing, by a temperature sensor, a temperature of the receiver;

wherein the controller determining the carrier offset correction based on the prior reception of communication signals from the desired transmitter, comprises retrieving the timing offset of the desired transmitter from the one or more stored timing offsets based on the previous communication with the desired transmitter and based on the sensed temperature.

\* \* \* \* \*